United States Patent
Biteau et al.

(10) Patent No.: US 11,725,136 B2
(45) Date of Patent: Aug. 15, 2023

(54) PROCESS FOR MANUFACTURING LIGHT ABSORBING POLYMER MATRIX

(71) Applicant: Essilor International, Charenton-le-Pont (FR)

(72) Inventors: John Biteau, Dallas, TX (US); Ronald Berzon, Dallas, TX (US); Pierre Fromentin, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/958,440

(22) PCT Filed: Dec. 19, 2018

(86) PCT No.: PCT/EP2018/085786
§ 371 (c)(1),
(2) Date: Jun. 26, 2020

(87) PCT Pub. No.: WO2019/129565
PCT Pub. Date: Jul. 4, 2019

(65) Prior Publication Data
US 2021/0054264 A1    Feb. 25, 2021

(30) Foreign Application Priority Data
Dec. 29, 2017    (EP) .................................. 17306976

(51) Int. Cl.
| | | |
|---|---|---|
| C09K 9/02 | (2006.01) | |
| C08L 31/06 | (2006.01) | |
| B01J 13/18 | (2006.01) | |
| B01J 13/22 | (2006.01) | |
| G02B 1/04 | (2006.01) | |
| G02C 7/10 | (2006.01) | |

(52) U.S. Cl.
CPC ................. *C09K 9/02* (2013.01); *B01J 13/18* (2013.01); *B01J 13/22* (2013.01); *C08L 31/06* (2013.01); *G02B 1/041* (2013.01); *G02C 7/102* (2013.01); *C08L 2207/53* (2013.01); *C08L 2310/00* (2013.01); *C09K 2211/1018* (2013.01)

(58) Field of Classification Search
CPC ... C09K 9/02; C09K 2211/1018; C08L 31/06; C08L 2207/53; C08L 2310/00; B01J 13/18; B01J 13/22; G02C 7/102; G02B 1/041
See application file for complete search history.

(56) References Cited

U.S. PATENT DOCUMENTS

| | | | | |
|---|---|---|---|---|
| 4,166,043 | A | | 8/1979 | Uhlmann et al. |
| 4,367,170 | A | * | 1/1983 | Uhlmann ................. G03C 1/73 252/385 |
| 5,359,085 | A | * | 10/1994 | Iwamoto ............. C07D 207/02 548/468 |
| 6,770,710 | B2 | * | 8/2004 | Robert ...................... C08F 2/44 524/95 |
| 2008/0026217 | A1 | * | 1/2008 | Kim ....................... G03C 1/733 427/212 |
| 2008/0251772 | A1 | | 10/2008 | Rohlfing et al. |
| 2010/0249271 | A1 | * | 9/2010 | Matyjaszewski ..... C08L 51/003 523/205 |
| 2011/0189462 | A1 | | 8/2011 | Shihui et al. |
| 2015/0368552 | A1 | * | 12/2015 | Izumi ....................... C09K 9/02 556/443 |
| 2015/0378181 | A1 | * | 12/2015 | Nahm ...................... G02B 5/23 252/586 |
| 2016/0032124 | A1 | * | 2/2016 | Banning ................ C09D 11/38 524/766 |

FOREIGN PATENT DOCUMENTS

| | | |
|---|---|---|
| JP | S 51-87177 A | 7/1976 |
| JP | S 63-175071 A | 7/1988 |
| JP | 2007-154198 | 6/2007 |
| WO | WO 2015/200714 | 12/2015 |

OTHER PUBLICATIONS

Fatemeh Ahangaran, Ali Hassanzadeh, and Sirous Nour, Surface modification of Fe3O4@SiO2 microsphere by silane coupling agent, International Nano Letters 2013, 3:23, pp. 1-5 (Year: 2013).*

International Search Report and Written Opinion issued in Corresponding PCT Application No. PCT/EP2018/085786, dated May 2, 2019.

Office Action issued in corresponding Chinese Application No. 201880074562.7, dated Oct. 20, 2021. (Chinese only. English Machine Translation).

Wang, Synthesis and Application of New Type Binder-Coated Pigments, Collection of Papers and Documents of Shanghai Printing and Dyeing Annual Conference, 1998, 7 pages. (Chinese only. See reference to document in corresponding Chinese Office Action dated Oct. 20, 2021.).

Office Action in corresponding Japanese Application No. 2020-528233, dated Jun. 22, 2022.

* cited by examiner

*Primary Examiner* — Bijan Ahvazi
(74) *Attorney, Agent, or Firm* — Norton Rose Fulbright US LLP

(57) ABSTRACT

An ophthalmic lens comprising a transparent polymer matrix and core shell nanoparticles which are dispersed in the transparent polymer matrix, wherein the core of core shell nanoparticles results from polymerization of a composition comprising nanoparticle core precursors and at least one photochromic compound, and the shell of core shell nanoparticles comprises a mineral compound.

17 Claims, No Drawings

PROCESS FOR MANUFACTURING LIGHT ABSORBING POLYMER MATRIX

CROSS-REFERENCE TO RELATED APPLICATIONS

This application is a national phase application under 35 U.S.C. § 371 of International Application No. PCT/EP2018/085786 filed 19 Dec. 2018, which claims priority to European Patent Application No. 17306976.6 filed 29 Dec. 2017. The entire contents of each of the above-referenced disclosures is specifically incorporated by reference herein without disclaimer.

The present invention relates to the field of colloids for use in optical articles.

Most photochromic dyes presents various degrees of performance reduction depending on the matrix in which they are used.

When used in coatings, specific coating polymers are needed to provide adequate micro-environment so that the photochromic dye included in these coating performs appropriately.

As such, when a given photochromic dye is to be combined with a preexisting technology and needs be incorporated into a polymeric substrate, providing an optimal matrix at the time of the manufacturing of the substrate to ensure their performance usually proves to be challenging.

To circumvent the issue, the dyes are typically introduced in the substrate after polymerization through imbibition. However, a matrix compatibility problem still arises, and specially designed matrixes, are necessary, for example with allylic monomer having extended linear domains.

Furthermore, the matrix properties ensuring optimal dyes performance are usually not compatible with the properties of a good substrate. The polymers which are appropriate for direct embedding of a photochromic dye generally suffer from lower thermo-mechanical performances. Indeed, good dyes matrixes are to be lightly reticulated which leads to a relative softness of the final substrate. Such issue is typically lackluster as substrates are required to be hard to support all mechanical constrains associated to their conformity.

In order to ensure good compatibility between a given matrix and a photochromic dye, or any light absorbing agent, it is known to encapsulate the light absorbing agent in a nanoparticle.

WO2015200714 discloses organic nanoparticles to be dispersed in organic matrices.

US2008251772 discloses a method of encapsulation of photochromic dyes through adsorption in mesoporous silica, and use in acrylics and polycarbonate matrices.

The advantages of encapsulation are numerous. Most importantly, it provides a chemical protection of the photochromic compound which allows its utilization in any matrix.

Therefore, light absorbing agents are typically adsorbed into a preformed core, and protected by a shell at a later stage which leads to a complex manufacturing process and adds requirements on the mechanical properties of the substrate which typically needs to be porous enough to allow the light absorbing agent to penetrate it.

The adsorption is a complicated step which cannot be performed with every light absorbing agent and which consistently complexify the overall manufacturing process.

Besides, encapsulating the light absorbing agent may damage it as these are typically very delicate and fail to withstand the conditions of polymerization.

In the ophthalmological field, additional constraints are to be considered as the matrix needs to present a high transparency and the properties of the light absorbing agent must not be altered by the nanoparticle in which it is encapsulated.

There is a need for a simplified process for manufacturing an ophthalmic lens comprising a transparent polymer matrix in which are dispersed nanoparticles encapsulating a photochromic compound.

In a first aspect, the present invention is an ophthalmic lens comprising a transparent polymer matrix and core shell nanoparticles which are dispersed in the transparent polymer matrix, wherein:

The core of core shell nanoparticles results from polymerization of a composition comprising nanoparticle core precursors and at least one photochromic compound, The shell of core shell nanoparticles comprises a mineral compound.

In a second aspect, the present invention cures the deficiencies of the prior Art by providing a process of preparation of an ophthalmic lens, comprising the steps of:

a) providing nanoparticle core precursors mixed with a photochromic compound;

b) polymerizing the nanoparticle core precursors so as to obtain nanoparticle cores encapsulating said photochromic compound;

c) forming a mineral shell on the nanoparticle cores encapsulating said photochromic compound so as to obtain core-shell nanoparticles encapsulating said photochromic compound;

d) providing a polymerizable transparent polymer matrix precursor;

e) mixing the transparent polymer matrix precursor and the core-shell nanoparticles;

f) curing the mixture obtained at step e) so as to obtain transparent polymer matrix in which are dispersed core-shell nanoparticles encapsulating a photochromic compound.

The photochromic compound is thus trapped in the core of the core-shell nanoparticles during polymerization of the nanoparticle core precursors.

As used herein, the term polymerization encompasses both classical organic polymerization such as addition or radical reactions, and inorganic polymerization such as olation, oxolation or more generally sol-gel reactions.

In particular, incorporation of a photochromic compound in the core of the core-shell nanoparticles by an agglomeration process without chemical reaction (such as precipitation or coascervation or spray drying) or by migration of said photochromic compound into a solid core (such as imbibition or adsorption) is not to be considered as polymerization. Cores of core-shell nanoparticles obtained by such processes are not satisfying and have intrinsic limitations on load of photochromic compound included in cores, or on low cross linking of core allowing for leakage of photochromic compound outside the core.

Unless explicitly stated otherwise, the word "or" is equivalent to "and/or". Similarly, the word "one" or "a" is equivalent to "at least one", unless stated otherwise.

As the photochromic compound is incorporated in the composition yielding the nanoparticle cores, it is easier to process the matrix without degrading the photochromic compound in subsequent steps of preparation. The core-shell structure isolates the photochromic material from chemical species during further chemical processing.

Incorporating the photochromic compound before the solidification of the matrix eases the whole process as it avoids further modification of the solid by impregnation or solid-solution interactions. Indeed mixing the photochromic dye with a liquid requires conventional manufacturing equipment, whereas modification of solid usually require specific and complex processes.

Furthermore, encapsulation allows controlling the immediate environment of each photochromic compound, enabling e.g. high local concentration of stabilizing agents such as HALS or anti-oxidant whilst keeping them at an overall low level in the matrix. A higher concentration of these agents would inhibit the polymerization of the matrix and, as such, were avoided in the prior Art. Therefore, the nanoparticles provided at step b typically bear high local concentration of stabilizing agents such as HALS or anti-oxidant.

Core Shell Nanoparticles

The nanoparticle core precursors preferably comprise monomers, oligomers or a mixture thereof. The monomers and oligomers can be of one kind or, in another embodiment, different kind of monomers or oligomers can be mixed together so as to generate a copolymer.

The nanoparticle core precursors comprised of monomers may be selected in the group consisting of a (meth)acrylic monomer, a vinylic monomer, an allylic monomer, urethane monomers and mixtures thereof. The monomers can be mono-functional, di-functional, poly-functional or a mixture thereof.

Preferably, the nanoparticle core precursors comprise a (meth)acrylic monomer, more preferably preferably butyl, ethyl or methyl (meth)acrylates, ethoxylated bisphenol-A diacrylates (BPA(EO)DA), polyethyleneglycol diacrylates (PEGDA). Polymerization of nanoparticle core precursors may be induced by initiators such as an organic azo compound, a peroxodisulfate salt, a UV initiator, or an organic peroxide.

A preferred feature of the resultant polymer is the glass transition temperature (Tg) or softness of the polymer. The change of molecular configuration of the photochromic material, which results in the desired darkening, must not be hindered by a too hard polymer. It is desirable that if a UV initiator is used, the UV initiator or its fragments not absorb in the same wavelength region as the photochromic materials as not to compete with the photochromic activation.

The nanoparticle core precursors comprised of oligomers may be selected in the group consisting of a urethane (di)acrylate, aliphatic urethane (di)acrylate, polyether polyurethane (di)acrylate, polyester urethane (di)acrylate, aromatic urethane (di)acrylate, acrylated acrylic oligomers, allylic oligomers or mixturers thereof.

In another embodiment, the nanoparticle core precursors may be selected from monomer undergoing reactions known as sol-gel. These monomers are derivatives of Silicon. Alkylalkoxysilane may be used, such as tetraethyloxysilane (TEOS), tetramethyloxysilane (TMOS), methyltriethoxysilane (MTES), dimethyldiethoxysilane (DMDES) and mixture thereof. Organically modified alkoxysilanes may be used, in particular epoxysilane, epoxydialkoxysilanes, epoxytrialkoxysilanes aminosilanes, and mixture thereof. Polymerization may be realized by Stöber synthesis or reverse microemulsion.

Mineral shell provides the very much suited protection to the light-absorbing compound and allows the subsequent step, in particular polymerization of transparent matrix, to take place without altering the optical properties thereof.

The shell of the core-shell nanoparticles can comprise a mineral oxide, such as SiO2, TiO2, ZrO2, Al2O3, ZnO, MgO or mixtures thereof. The shell may be obtained by polymerization on the surface of the core of nanoparticles of a precursor selected from alkoxysilanes, titanium alkoxylate, zirconium alkoxylate, aluminium alkoxide, zinc hydroxide, magnesium hydroxide, and mixtures thereof. Preferred precursors are tetraethyloxysilane (TEOS), tetrabutyl orthotitanate (TBOT), tetrabutyl orthozirconate (TBOZ).

Such oxides prevent diffusion of photochromic compound out of the particles, and the diffusion of chemicals inside the core of the core-shell nanoparticles that could destroy the photochromic compound inside the particle.

The shell of the core-shell nanoparticles preferably does not comprise any organic compound. Indeed, organic shells proved to occasion diffusion of chemicals either from the matrix toward to the core or from the core toward the matrix, which can lead to damages to the photochromic compound and consequently alter its optical properties.

The refractive index of the core-shell nanoparticles preferably ranges from 1.47 to 1.74, as measured according to the ISO 489:1999.

The size of the core-shell nanoparticles is, for example, from 1 nm to 10 μm, preferably from 10 nm to 5 μm, as measured according to the Dynamic Light Scattering method.

The core-shell nanoparticles can endure any suitable surface modification so as to improve compatibility into the host matrix, in particular to reduce haze and improve their dispersability. One such surface modification can include the addition of functional groups such as (meth)acrylic, vinylic, allylic, amine, glycydol or thiol/mercapto. The core-shell nanoparticle can be exposed to functional-silanes such as triethoxysilanes, trimethoxysilanes, diethoxysilanes, dimethoxysilanes or even monoethoxysilanes or monomethoxysilanes. Preferred materials can include 3-(meth)acryloxypropyltrimethoxysilane, 3-(meth)acryloxypropyltriethoxysilane, 3-acryloxypropylmethyldimethoxysilane, 3-acryloxypropylmethyldiethoxysilane 3-acryloxypropyldimethylmethoxysilane, 3-acryloxypropyldimethylethoxysilane or vinyltrimethoxysilane, vinyltriethoxysilane or allyltrimethoxysilane, allyltriethoxysilane, 3-allyloxypropyltrimethoxysilane, 3-allyloxypropyltriethoxysilane, allylmethyldimethoxysilane, allylmethyldiethoxysilane, allyldimethylmethoxysilane, allyldimethylethoxysilane or γ-aminopropyltrimethoxysilane, γ-aminopropyltriethoxysilane, 3-(glycidyloxypropyl)trimethoxysilane, 3-(glycidyloxypropyl)triethoxysilane, 3-mercaptopropyltrimethoxysilaneand 3-mercaptopropyltriethoxysilane.

The photochromic compound can be of only one kind or, alternately, can consist in a mixture of photochromic compounds of different kinds. In the latter case, each core-shell nanoparticle can comprise different kinds of photochromic compounds or there can be core-shell nanoparticles comprising only one kind of photochromic compound. Each core-shell nanoparticle can but need not be similar to the other core-shell nanoparticles. Both configurations can be of interest and will lead to different optical properties.

If all the core-shell nanoparticles are not encapsulating the same photochromic compounds, there will be different kinds of core-shell nanoparticles with different optical properties. It will thus be possible to tune the matrix optical properties by incorporating different amounts of each kind of core-shell nanoparticle.

Photochromic compounds can typically alternate between several tridimensional configuration when exposed to certain wavelength radiation (typically UV), each configuration absorbing different wavelength radiations. For instance, the photochromic compound can present a colored form, i.e. a configuration which absorb visible wavelength radiations, and a transparent form, which absorb outside of the visible spectrum.

Said photochromic compound is preferably chosen from benzopyrans, naphthopyrans, spirobenzopyrans, spironaphthopyrans, spirobenzoxzines, spironaphthoxazines, fulgides or fulgimides.

A molar absorption coefficient of said photochromic compound in a colored form can be higher than 5000 L mol$^{-1}$ cm$^{-1}$, preferably 20000 L mol$^{-1}$ cm$^{-1}$.

The amount of photochromic compound in the core-shell nanoparticles can be from 0.0001 to 90 wt %, in particular from 0.01 to 50% wt %, more particularly from 0.1 to 10 wt % based on the total weight of the core-shell nanoparticles.

The amount of photochromic compound will determine the overall coloration of the final matrix. Depending on the desired coloration, on the absorption coefficient and on the amount of photochromic compound per core-shell nanoparticle, it will be possible to adapt the amount of core-shell nanoparticle in the matrix.

Transparent Polymer Matrix

The transparent polymer matrix precursor preferably comprises monomers, oligomers or a mixture thereof. The monomers and oligomers can be of one kind or, in another embodiment, different kind of monomers or oligomers can be mixed together so as to generate a copolymer.

The transparent polymer matrix is chosen from a thermoplastic resin, such as a polyamide, polyimide, polysulfone, polycarbonate, polyester, polyethylene terephthalate, poly(meth)acrylate), PMMA, polycyclic olefin copolymer, thermoplastic elastomers, thermoplastic urethanes, polycellulose triacetate or copolymers thereof, or transparent polymer matrix is chosen from a thermosetting resin, such as a homopolymer or copolymer of diallyl esters, a homopolymer or copolymer of diallyl carbonates of linear or branched aliphatic or aromatic polyols, a homopolymer or copolymer of (meth)acrylates, a homopolymer or copolymer of (meth)acrylic acid and esters thereof, a homopolymer or copolymer of thio(meth)acrylic acid and esters thereof, a homopolymer or copolymer of urethane and thiourethane, a homopolymer or copolymer of epoxy, a homopolymer or copolymer of sulfide, a homopolymer or copolymer of disulfide, a homopolymer or copolymer of episulfide, a homopolymer or copolymer of polythiol and polyisocyanate, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

To be mentioned as especially preferred classes of substrate materials are polycarbonates, polyamides, polyimides, polysulfones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR 39® by PPG), polycarbonates such as those derived from bisphenol-A, (meth)acrylic or thio(meth)acrylic polymers and copolymers such as poly methyl methacrylate (PMMA), urethane and thiourethane polymers and copolymers, epoxy polymers and copolymers, episulfide polymers and copolymers.

In particular, a diethylene glycol bis(allyl carbonate), such as CR39®, in particular with a refractive index of 1.5, sold by PPG Industries, allylic and (meth)acrylic copolymers, having a refractive index between 1.54 and 1.58, a polythiourethane, such as MR series provided by Mitsui Chemicals: MR6®, MR7®, MR8®, MR10®, MR174®, or even Polycarbonate are suitable materials for substrates.

Preferably the refractive index of the core-shell nanoparticles is identical to the refractive index of the transparent polymer matrix, as measured according to the ISO 489: 1999. If refractive index of core is different from refractive index of shell, the refractive index of the core-shell nanoparticles is the average refractive index measured according to the ISO 489:1999. In this case, the optical properties of the transparent polymer matrix are easier to adapt to ophthalmological usage.

The amount of the core-shell nanoparticles in the transparent polymer matrix can be from 0.001 to 2 wt %, preferably from 0.0025 to 1 wt % based on the weight of the transparent polymer matrix.

As aforesaid, the amount of core-shell nanoparticles will have an impact on the overall optical properties of the matrix, together with the properties of the photochromic compound and with the amount of photochromic compound per core-shell nanoparticles.

The transparent polymer matrix is preferably an optical substrate or a coating deposited on an optical substrate.

As used herein, a coating that is said to be coated on a surface of a substrate is defined as a coating, which (i) is positioned above the substrate, (ii) is not necessarily in contact with the substrate, that is to say one or more intermediate layers may be arranged between the substrate and the coating in question, and (iii) does not necessarily completely cover the substrate.

As used herein, an optical substrate is understood to mean an uncoated polymer substrate, generally with two main surfaces corresponding in the finished ophthalmic lens to the front and rear faces thereof. The bulk of a transparent polymer substrate is made of an optically transparent polymer, generally chosen from transparent polymers of ophthalmic grade used in the ophthalmic industry, and formed to the shape of an optical device The ophthalmic lens of the invention may comprise functional coatings classically used in optics such as an impact-resistant and/or adhesion primer, an abrasion-resistant and/or scratch-resistant coating, an anti-reflection coating, an antistatic coating, an anti-soiling coating, an anti-smudge coating, an anti-dust coating, an anti-fog coating, a water repellent coating, an interferential filter, a tinted coating, a mirror coating, and a combination of any of preceding compatible coatings, especially an impact-resistant primer coating coated with an abrasion and/or scratch-resistant coating.

The ophthalmic lens is herein defined as a lens which is designed to fit a spectacles frame so as to protect the eye and/or correct the sight. Said ophthalmic lens can be an non-corrective ophthalmic lens (also called plano or afocal lens) or a corrective ophthalmic lens. Corrective lens may be a unifocal, a bifocal, a trifocal or a progressive lens.

Process

The process of preparation of an ophthalmic lens according to the invention comprises the steps of:

a) providing nanoparticle core precursors mixed with a photochromic compound;

b) polymerizing the nanoparticle core precursors so as to obtain nanoparticle cores encapsulating said photochromic compound;

c) forming a mineral shell on the nanoparticle cores encapsulating said photochromic compound so as to obtain core-shell nanoparticles encapsulating said photochromic compound;

d) providing a polymerizable transparent polymer matrix precursor;

e) mixing the transparent polymer matrix precursor and the core-shell nanoparticles;

f) curing the mixture obtained at step e) so as to obtain transparent polymer matrix in which are dispersed core-shell nanoparticles encapsulating a photochromic compound.

The matrix thus polymerizes at step f), after the incorporation of the core-shell nanoparticles encapsulating a photochromic compound. Step f) can comprise the activation of a previously incorporated initiator. The polymerization can be activated thermally and/or through ionizing agents such as UV radiations.

The polymerization of the matrix can be performed in a mold so as to give the matrix a predetermined shape.

The process according to the present invention can further comprise a step e1 between step e and step f, wherein step e1 consists in:

e1) depositing the mixture obtained at step e) on a substrate.

Such step allows forming a coating comprising the photochromic compounds over a substrate. Such coating could not be formed easily if the photochromic compounds were to be incorporated post polymerization, as in the prior Art.

Step e1 can be performed by any suitable means and preferably deposited or formed through various methods, including wet processing (dip coating, spray deposition or spin coating) and film transfer.

The core-shell nanoparticles of step c are preferably provided either in the form of a powder which is dispersible within the transparent polymer matrix precursor, or in the form of a dispersion of core-shell nanoparticles in a liquid which is dispersible within the transparent polymer precursor.

The present invention will be more fully understood from the following detailed description of the exemplary embodiments thereof—to which the invention is not limited however.

For the sake of these two exemplary embodiments, the matrix used is made of diethyleneglycol bis allylcarbonate which will be referred to as CR39®.

CR39® is obtained by polymerizing diethyleneglycol bis allylcarbonate (ADC) in presence of an organic peroxide such as diisopropyl peroxydicarbonate (IPP), di-sec-butyl peroxydicarbonate or other suitable peroxides known to those skilled in the art. ADC and IPP correspond to the polymerizable transparent polymer matrix precursors of the present invention and will be referred to as "precursors" in the following examples. Due to the allyl groups of the ADC, the polymer naturally crosslinks. The polymerization is activated thermally at a temperature of about 40° C. to 95° C.

The example will thus provide detailed synthesis for core-shell nanoparticles encapsulating photochromic compounds which are able to withstand the polymerization conditions of CR39® whilst preserving the optical properties of the photochromic compounds.

The photochromic compound used in both example is 1,3,3-Trimethylspiro[indoline-2,3'-[3H]naphth[2,1-b][1,4] oxazine], 27333-47-7. This dye is very suitable as it proved particularly resistant to radical polymerization.

EXAMPLE 1: HYBRID ORGANIC-INORGANIC CORE AND MINERAL SHELL

In this example, the core-shell nanoparticle possesses a core having a composition based on Methyltriethoxysilane (MTES) and Dimethyldiethoxysilane (DMDES), and a shell having a composition based on Tetraethoxysilane (TEOS).

Core:

A solution A is made by adding 4.0 g of DMDES (nanoparticle core precursor) and 1.6 g of MTEOS (nanoparticle core precursor) to solubilize 59 mg of the photochromic dye 1,3-Dihydro-1,3,3-trimethylspiro[2H-indole-2,3'-[3H]naphth[2,1-b][1,4]oxazine] (CAS number 27333-47-7). A solution B is prepared by adding 23 mL of ammonium hydroxide (30% w/w in water) to 172 mL of ethanol, and then 0.92 g of PEL-SIL PEPG-1818 surfactant, under constant stirring. The solution A is then poured into the solution B under vigorous stirring. The resulting white emulsion is kept under permanent stirring for 24 h at room temperature.

At this stage some obtained particles can be separated for characterization: the emulsion is split into several tubes and submitted to centrifugation for 20 min at 5000 rpm. The supernatant is then discarded and the white settled material is redispersed in ethanol using vortex and ultrasonication. The typical size of the particles is 150-200 nm. These particles show photochromic properties.

Shell:

83 g of TEOS are very slowly added dropwise to the vigorously stirred white emulsion, from the previous step, and mixing is maintained for an additional 24 h at room temperature. The resulting suspension is dialyzed. The retentate is concentrated. Core shell nanoparticle size is ca. 210-260 nm. These core shell nanoparticles show photochromic properties, demonstrating that photochromic dye has not been degraded during polymerization and shell formation.

Optional Surface Functionalization:

The shell can be further functionalized with pendant reactive groups. The reactive groups can be (meth)acrylic, vinylic, allylic, amine, glycydol or thiol/mercapto groups. The core-shell particle can be exposed to functional-silanes such as triethoxiysilanes, trimethoxysilanes, diethoxysilanes, dimethoxysilanes or even monoethoxysilanes or monomethoxysilanes. Examples include 3-acryloxypropyltrimethoxysilane, 3-acryloxypropyltriethoxysilane, 3-acryloxypropylmethyldimethoxysilane, 3-acryloxypropylmethyldiethoxysilane 3-acryloxypropyldimethylmethoxysilane, 3-acryloxypropyldimethylethoxysilane, vinyltrimethoxysilane, vinyltriethoxysilane, allylthrimethoxysilane, allyltriethoxysilane, allylmethyldimethoxysilane, allyldimethylethoxysilane, allyldimethylmethoxysilane, allyldimethylethoxysilane, 3-allyloxypropyltrimethoxysilane, 3-allyloxypropyltriethoxysilane, γT-aminopropyltrimethoxysilane, γ-aminopropyltriethoxysilane, 3-(glycidyloxypropyl)trimethoxysilane, 3-(glycidyloxypropyl) triethoxysilane, 3-mercaptopropyltrimethoxysilane and 3-mercaptopropyltriethoxysilane Masterbatch 0.3 g of the above powder is mixed and dispersed well into approximately 100 g of CR39®. The masterbatch is ready to be used in ophthalmic lenses monomer formulation.

EXAMPLE 2: POLYMER CORE AND MINERAL SHELL

In this example the core-shell nanoparticle possesses a core having a composition based on poly(methyl methacrylate) (PMMA), and a shell of TEOS.

The core can be polymerized either through Azobisisobutyronitrile (AIBN) activation or through potassium persulfate activation. Cetrimonium bromide (CTAB) is used both as a buffer and as an antiseptic agent to avoid contamination of the solution during the reaction which can last several days.

Core (AIBN):

200 mL of a solution of CTAB in water (6%) is charged in the reactor. The solution is subjected to a nitrogen purge to displace the oxygen for a minimum of 30 minutes. The photochromic dye 1,3,3-Trimethylspiro[indoline-2,3'-[3H]naphth[2,1-b][1,4]oxazine], (CAS number: 27333-47-7, 40 mg) is solubilized in methyl methacrylate (MMA, nanoparticle core precursor) monomer (2 g) containing AIBN (200 mg). The reactor is then charged with the MMA monomer mixture and stirred for 15 minutes to disperse the monomer droplets in the water phase. The reaction mixture is then heated to 80° C. to initiate the polymerization. The polymerization is allowed to continue for 3 hours to complete conversion of MMA to PMMA. After complete polymerization, the transparent PMMA latex is then dialyzed to remove surfactant and change solvent to ethanol. Particle size is ca. 200 nm.

Core (K Persulfate):

200 mL of a solution of CTAB in water (6%) is charged in the reactor. The solution is subjected to a nitrogen purge to displace the oxygen for a minimum of 30 minutes and is simultaneously heated to 80° C. The photochromic dye 1,3,3-Trimethylspiro[indoline-2,3'-[3H]naphth[2,1-b][1,4]oxazine], 27333-47-7, (40 mg) is solubilized in MMA (nanoparticle core precursor) monomer (2 g). The reactor is then charged with the MMA monomer containing the photochromic dye and stirred for 15 minutes to disperse the monomer droplets in the water phase. 200 mg of potassium persulfate (KPS) or ammonium persulfate (APS) dissolved in 2 mL of deionized water is added to the reaction mixture to initiate the polymerization. The polymerization is allowed to continue for 3 hours to complete conversion of MMA to PMMA. After complete polymerization, the transparent PMMA latex is then dialyzed to remove surfactant and change solvent to ethanol. Particle size is ca. 200 nm.

Shell:

200 mL of Polyvinylpyrrolidone (PVP) ethanolic solution (log/L) is added to the above stock dispersion, and gently stirred overnight at room temperature to ensure adsorption. Then, an ammonium hydroxide solution (10 ml of 29% in water solution) and 20 ml of TEOS are added, and mixing is maintained for an additional 24 hours at room temperature, then dialyzed. The retentate is then concentrated. Core shell nano particle size is ca.300 nm. These core shell nanoparticles show photochromic properties, demonstrating that photochromic dye has not been degraded during polymerization and shell formation.

Silica shell may also be grown directly from aqueous particles dispersion without resorting to PVP and solvent change.

Transfer to Monomer:

CR39® is slowly added (20 g) in above dispersion. Ethanol is then stripped under vacuum. A CR39® masterbatch is thus obtained.

EXAMPLE 3: PREPARATION OF LENSES

| Material | Parts by weight |
| --- | --- |
| CR39® | 72.0 |
| CR39E® | 2.0 |
| Master batch from Ex1 or Ex 2 | 20.0 |
| IPP | 3.2 |

The monomer blend is manufactured by weighing and mixing the ingredients in a beaker at room temperature. CR39® and CR39E® are first mixed. Then core-shell nanoparticles in masterbatch are added and beaker content is mixed again until full dispersion. Finally, IPP is added and the mixture is stirred thoroughly, then degassed and filtered.

A 71 mm diameter glass bi-plano mold was then filled with the composition using a syringe and the polymerization was carried out in a regulated electronic oven in which the temperature was gradually increased from 45° C. to 85° C. in 15 hours then kept constant at 85° C. for 5 hours. The mold was then disassembled and the resulting lens had a 2 mm thickness in its center.

It is understood that the herein described embodiments do not limit the scope of the present invention and that it is possible to implement improvements without leaving the scope of the present invention.

In particular, different dyes and different precursors than the one exemplified can be used without departing from the scope of the present invention.

The invention claimed is:

1. An ophthalmic lens comprising a transparent polymer matrix and core-shell nanoparticles which are dispersed in the transparent polymer matrix, wherein:
   the core of the core-shell nanoparticles results from polymerization of a composition comprising nanoparticle core precursors and at least one photochromic compound; and
   the shell of the core-shell nanoparticles comprises a mineral compound;
   wherein the core of the core-shell nanoparticles comprises the at least one photochromic compound embedded within the core, wherein the amount of the at least one photochromic compound in the core-shell nanoparticles is from 0.0001 to 90 wt % based on the total weight of the core-shell nanoparticles;
   wherein the nanoparticle core precursors comprise an alkylalkoxysilane monomer further defined as tetraethyloxysilane (TEOS), tetramethyloxysilane (TMOS), methyltriethoxysilane (MTES), dimethyldiethoxysilane (DMDES), or a mixture thereof and/or an organically modified alkoxysilane monomer further defined as epoxysilane, epoxydialkoxysilanes, epoxytrialkoxysilanes, aminosilanes, or a mixture thereof; and
   wherein the amount of the core-shell nanoparticles in the transparent polymer matrix is from 0.001 to 2 wt % based on the weight of the transparent polymer matrix.

2. The ophthalmic lens according to claim 1, wherein a molar absorption coefficient of the at least one photochromic compound in a colored form is higher than 5000 L mol$^{-1}$ cm$^{-1}$.

3. The ophthalmic lens according to claim 2, wherein the molar absorption coefficient of the at least one photochromic compound in a colored form is 20000 L mol$^{-1}$ cm$^{-1}$.

4. The ophthalmic lens according to claim 1, wherein the amount of the at least one photochromic compound in the core-shell nanoparticles is from 0.01 to 50% wt % based on the total weight of the core-shell nanoparticles.

5. The ophthalmic lens according to claim 1, wherein the transparent polymer matrix is any one of the following thermoplastic resins: polyamide, polyimide, polysulfone, polycarbonate, polyester, polyethylene terephthalate, poly(meth)acrylate, poly(methyl(meth)acrylate) (PMMA), polycyclic olefin copolymer, thermoplastic elastomers, thermoplastic urethanes, polycellulose triacetate or copolymers thereof, or wherein the transparent polymer matrix is any one of the following thermosetting resins: a homopolymer or copolymer of diallyl esters, a homopolymer or copolymer of diallyl carbonates of linear or branched aliphatic or aromatic polyols, a homopolymer or copolymer of (meth)acrylates, a homopolymer or copolymer of (meth)acrylic acid and esters thereof, a homopolymer or copolymer of thio(meth)acrylic acid and esters thereof, a homopolymer or copolymer of urethane and thiourethane, a homopolymer or copolymer of epoxy, a homopolymer or copolymer of sulfide, a homopolymer or copolymer of disulfide, a homopolymer or copolymer of episulfide, a homopolymer or copolymer of polythiol and polyisocyanate, and combinations thereof.

6. The ophthalmic lens according to claim 1, wherein the shell of the core-shell nanoparticles comprises a mineral oxide further defined as $SiO_2$, $TiO_2$, $ZrO_2$, $Al_2O_3$, ZnO, MgO or mixtures thereof.

7. The ophthalmic lens according to claim 1, wherein the refractive index of the core-shell nanoparticles ranges from 1.47 to 1.74.

8. The ophthalmic lens according to claim 7, wherein the refractive index of the core-shell nanoparticles is identical to the refractive index of the transparent polymer matrix.

9. The ophthalmic lens according to claim 1, wherein the surface of the shell of the core-shell nanoparticles is functionalized with (meth)acrylic, vinylic, allylic, amine, glycidol, or thiol/mercapto groups.

10. The ophthalmic lens according to claim 9, wherein the surface of the shell of the core-shell nanoparticles is functionalized by 3-acryloxypropyltrimethoxysilane, 3-acryloxypropyltriethoxysilane, 3-acryloxypropylmethyldimethoxysilane, 3-acryloxypropylmethyldiethoxysilane 3-acryloxypropyldimethylmethoxysilane, 3-acryloxypropyldimethylethoxysilane, vinyltrimethoxysilane, vinyltriethoxysilane, allyltrimethoxysilane, allyltriethoxysilane, allylmethyldimethoxysilane, allyldimethylethoxysilane, allyldimethylmethoxysilane, allyldimethylethoxysilane, 3-allyloxypropyltrimethoxysilane, 3-allyloxypropyltriethoxysilane, γ-aminopropyltrimethoxysilane, γ-aminopropyltriethoxysilane, 3-(glycidyloxypropyl)trimethoxysilane, 3-(glycidyloxypropyl)triethoxysilane, 3-mercaptopropyltrimethoxysilane or 3-mercaptopropyltriethoxysilane.

11. The ophthalmic lens according to claim 1, wherein the size of the core-shell nanoparticles is from 1 nm to 10 μm, as measured according to the Dynamic Light Scattering method.

12. The ophthalmic lens according to claim 11, wherein the size of the core-shell nanoparticles is from 10 nm to 5 μm, as measured according to the Dynamic Light Scattering method.

13. The ophthalmic lens according to claim 1, wherein the amount of the core-shell nanoparticles in the transparent polymer matrix is from 0.0025 to 1 wt % based on the weight of the transparent polymer matrix.

14. The ophthalmic lens according to claim 1, wherein the transparent polymer matrix is an optical substrate or a coating deposited on an optical substrate.

15. A process of preparation of an ophthalmic lens, comprising the steps of:
  a) providing nanoparticle core precursors comprising an alkylalkoxysilane monomer further defined as tetraethyloxysilane (TEOS), tetramethyloxysilane (TMOS), methyltriethoxysilane (MTES), dimethyldiethoxysilane (DMDES), or a mixture thereof and/or an organically modified alkoxysilane monomer further defined as epoxysilane, epoxydialkoxysilanes, epoxytrialkoxysilanes, aminosilanes, or a mixture thereof mixed with a photochromic compound, wherein an amount of the at least one photochromic compound in the core-shell nanoparticles is from 0.0001 to 90 wt % based on the total weight of the core-shell nanoparticles;
  b) polymerizing the nanoparticles core precursors so as to obtain nanoparticle cores encapsulating said photochromic compound;
  c) forming a mineral shell on the nanoparticle cores encapsulating said photochromic compound so as to obtain core-shell nanoparticles encapsulating said photochromic compound;
  d) providing a polymerizable transparent polymer matrix precursor;
  e) mixing the transparent polymer matrix precursor and the core-shell nanoparticles;
  f) curing the mixture obtained at step e) so as to obtain transparent polymer matrix in which are dispersed core-shell nanoparticles encapsulating said photochromic compound, wherein an amount of the core-shell nanoparticles in the transparent polymer matrix is from 0.001 to 2 wt % based on the weight of the transparent polymer matrix.

16. The process according to claim 15, further comprising a step e1 between step e and step f, wherein step e1 consists in:
  e1) depositing the mixture obtained at step e) on a substrate.

17. The process according to claim 15, wherein the core-shell nanoparticles of step c are provided either in the form of a powder which is dispersible within the transparent polymer matrix precursor, or in the form of a dispersion of core-shell nanoparticles in a liquid which is dispersible within the transparent polymer precursor.

* * * * *